United States Patent [19]

Shields et al.

[11] 4,442,587
[45] Apr. 17, 1984

[54] STRIPPING MACHINE FOR REMOVING INSULATION FROM FLAT CABLE

[76] Inventors: Charles E. Shields, 655 Woodland Dr., Crystal Lake, Ill. 60014; Leonard R. Giese, 1307 Post Dr., Rockford, Ill. 61108

[21] Appl. No.: 275,838

[22] Filed: Jun. 22, 1981

[51] Int. Cl.³ .............................................. H02G 1/12
[52] U.S. Cl. .................................. 29/564.4; 49/33 F; 81/9.51
[58] Field of Search ............. 51/40, 5 B, 103 R, 80 R; 29/33 F, 33 Q, 33 S, 564.3, 564.4; 81/9.5 R, 9.51; 33/147 L, 148 E

[56] References Cited

U.S. PATENT DOCUMENTS

| | | | |
|---|---|---|---|
| 1,843,614 | 2/1932 | Lott | 51/103 R X |
| 2,083,373 | 6/1937 | Hardesty et al. | 33/148 E |
| 2,693,056 | 11/1954 | Gagne | 51/40 |
| 3,095,768 | 7/1963 | Walstrom | 81/9.51 |
| 3,385,140 | 5/1968 | Carpenter et al. | 81/9.51 |
| 4,276,798 | 7/1981 | Gottschalk | 81/9.51 X |

Primary Examiner—E. R. Kazenske
Assistant Examiner—Douglas D. Watts
Attorney, Agent, or Firm—Marvin N. Benn

[57] ABSTRACT

The present invention relates to an improved stripping machine for removing insulation from flat cable wherein, the cable has a plurality of conductors positioned in substantially the same plane. The instant machine includes a frame having a pair of arms movably and pivotally mounted on the frame. A grinding wheel is rotatably mounted on each of the arms. One of the grinding wheels has a larger diameter than the other grinding wheel. An adjustment device is connected to the arms for simultaneously positioning the grinding wheels relative to the conductors. The arms with the grinding wheels are movable in a direction transverse to a length of flat cable to remove insulation from the cable. The wheels move in opposite directions at the positions where the wheels engage opposite sides of the cable. Drive rollers are mounted on the frame for pulling the cable along the length of the cable and along the length of the table mounted on the frame. A pair of opposed slit rollers is mounted on the frame to separate selectively conductors of the cable.

9 Claims, 7 Drawing Figures

STRIPPING MACHINE FOR REMOVING INSULATION FROM FLAT CABLE

BACKGROUND OF THE INVENTION

The utilization of flat cable having a plurality of conductors has found wide acceptance in many areas especially as a replacement for a wire harness in electronic equipment. Flat cable typically has a plurality of conductors contained therein, positioned in substantially one place. As economical method of manufacturing the cable is one in which long lengths of cable is produced. The user of the cable then cuts the cable to selected lengths. The insulation of the cable must be removed in order to expose the conductors contained in the flat cable in order to attach the conductors to terminals for making electrical connections.

A well-known machine for removing insulation from such cable is shown in U.S. Pat. No. 3,385,140 issued May 28, 1968, to H. J. Carpenter et al entitled "Flat Multi-Conductor Stripping Apparatus". The device taught in the Carpenter patent teaches a construction wherein, cable is cut, and then the end of the cut cable is placed between two rotating grinding wheels to remove the insulation from the conductors at that end. The apparatus is satisfactory for its intended purpose. However, it may be appreciated that the rate of production using the Carpenter et al apparatus is low. In addition, the Carpenter apparatus requires fine adjustment of the grinding wheels. The spacing between the grinding wheels must be finely adjusted in order to have a removal of the insulation without damage to the conductors. This requires a high degree of skill on the part of the operator and in some instances creates a certain amount of spoilage.

SUMMARY OF THE PRESENT INVENTION

The herein disclosed stripping machine provides an apparatus for stripping insulation off flat cable wherein, the insulation may be removed from selected positions of a continuous length of flat cable and then the cable may be cut after the insulation has been removed. The present invention provides a construction having a frame with a table mounted on the frame. The table contains a groove which receives the cable. The width of the groove is adjustable to accommodate cables of various widths. A pair of drive rollers is rotatably mounted on the frame for engaging the flat cable to move it longitudinally along the length of the cable and along the length of the table. A grinding base is movably mounted on a track fixed to the frame. A pair of arms is pivotally mounted on the grinding base on spaced pivots. A grinding wheel is rotatably mounted on each of the arms. One grinding wheel has a larger diameter than the other grinding wheel. An adjustment device is connected to the arms for holding the arms in a selected relationship and thereby, hold the grinding wheels in a selected spacial relationship. The grinding wheels are positioned in the same plane. A drive is connected to the grinding wheels to rotate the grinding wheels in the same direction. The grinding base is movable in a direction transverse to the groove so that, the grinding wheels may be moved into a position to engage a flat cable positioned in the groove to remove insulation from opposite sides of the flat cable and thereby expose the conductors in the cable. Since the grinding wheels are rotating in the same direction and are on the top and bottom of the flat cable, the periphery of the grinding wheels is moving in opposite directions when the grinding wheels engage the cable. A pair of slit rollers are rotatably mounted on the frame for engaging and slitting the cable prior to engagement of the cable with the drive rollers.

DESCRIPTION OF THE PREFERRED EMBODIMENT

Figure 1:
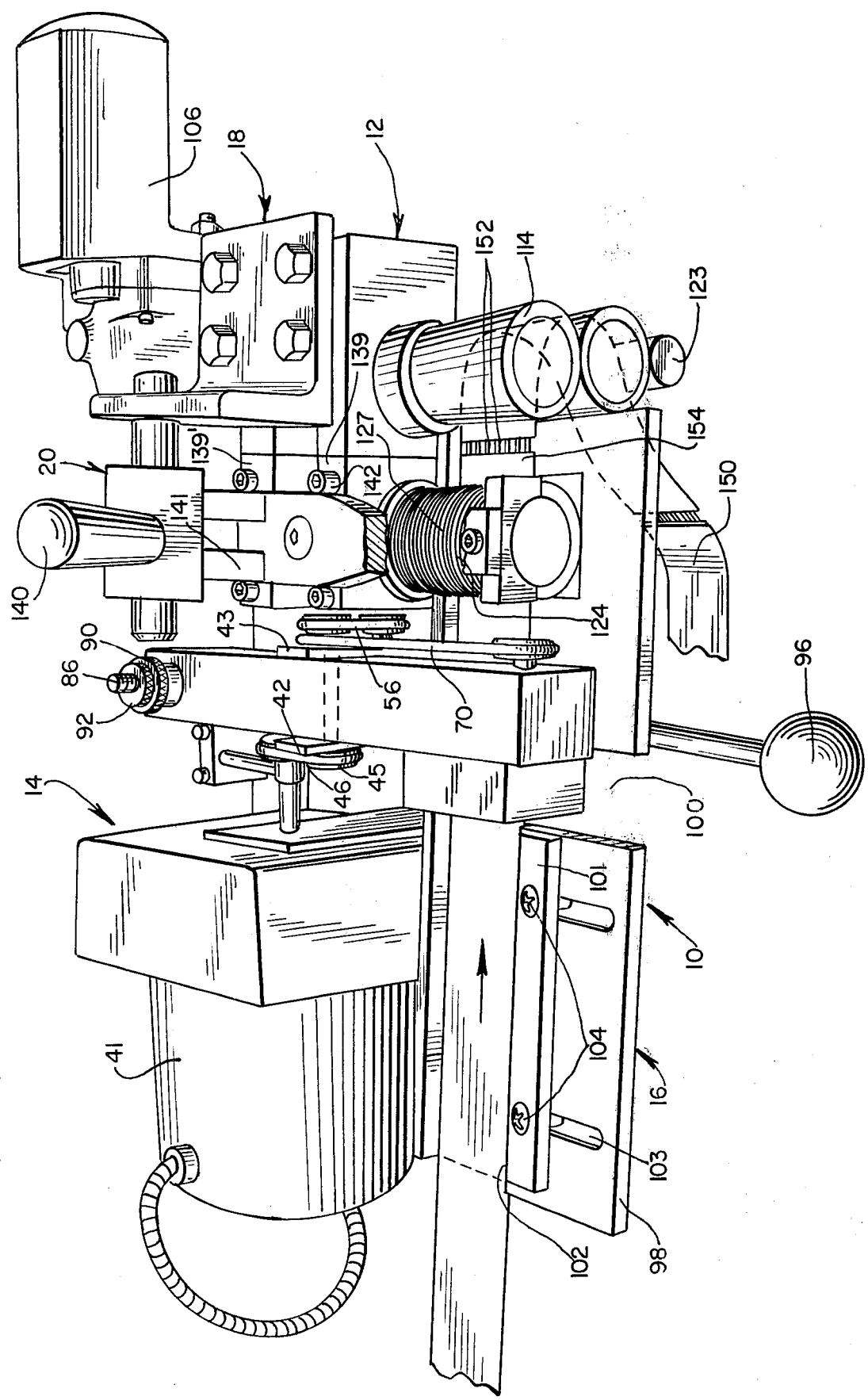
FIG. 1 is a perspective view of an apparatus for removing insulation from flat cable embodying the herein disclosed invention showing a piece of flat cable in the apparatus and grinding wheels in position to remove insulation.

Referring now to the drawings and especially to FIG. 1, a stripping machine for removing insulation from a flat cable embodying the herein disclosed invention is shown in perspective view therein and is generally indicated by numeral 10. Stripping machine 10 generally includes a frame 12, a grinding assembly 14 slidably mounted on the frame, a table 16 mounted on the frame, a drive assembly 18, and a slitting assembly 20 mounted on the frame and drivingly connected to the drive assembly.

Frame 12 includes a base plate 22 with a support wall 24 fixed to base plate 22. A track assembly 26 is mounted on base plate 22. The track assembly includes a pair of parallel rods 28 and 30. Rod 28 is supported on one end by an end block assembly 32 and on the other end by end block assembly 34. Rod 30 is supported on one end by end block assembly 36 and on the other end by end block assembly 38. Rods 28 and 30 are polished steel rods and are arranged parallel to each other. The rods 28 and 30 are positioned the same height above base plate 22 to define a plane parallel to the base plate.

Grinding assembly 14 is slidably mounted on rods 28 and 30. The grinding assembly includes a grinding base plate 40 which is slidably mounted on the rods 28 and 30. An enclosed electric grinder drive motor 41 is mounted on the plate 40. A pair of support plates 42 and 43 are fixed to the plate 40, and plates 42 and 43 are substantially perpendicular to base plate 40. An upper drive shaft 44 is rotatably mounted on support plates 42 and 43. The upper drive shaft is connected to drive motor 41 through a pulley 45 fixed on one end of the drive shaft, which pulley is drivingly engaged by a drive belt 46. Belt 46 engages a motor pulley 47 which is fixed to an output shaft of drive motor 41. An upper arm 48 is pivotally mounted on shaft 44. A lower arm 50 is pivotally mounted on shaft 49. A sheave 52 is mounted on the other end of upper drive shaft 44. A sheave 54 is mounted on lower drive shaft 49 below sheave 52. An interarm drive belt 56 is mounted on sheaves 52 and 54. An upper axle 58 is rotatably mounted in upper arm 48 adjacent to one end thereof. A lower axle 60, identical to the upper axle, is rotatably mounted in lower arm 50 adjacent to one end thereof and positioned below and parallel to upper axle 58. The upper axle has an upper axle sheave 62 fixed to one end and an upper grinding wheel 64 fixed to the other end. A lower axle sheave 66 is fixed to one end of the lower axle and a lower grinding wheel 68 is fixed to the other end. An upper arm drive belt 70 drivingly connects sheave 52 with upper axle sheave 62. In a like manner, a lower arm drive belt 72 drivingly connects sheave 54 with lower axle sheave 66. Grinding wheels 64 and 68 are in the same plane, and both grinding wheels are made of fiberglass material. Upper grinding wheel 64 has an outside diameter of one and three-quarter inches while lower grinding wheel 68 is larger having an outside diameter of two inches. Sheaves 52 and 54 have the same diameter as do upper axle sheave 62 and lower axle sheave 66 so that upper grinding wheel 64 and lower grinding wheel 68 rotate at the same speed and in the same direction. Thus, the adjacent peripheral surfaces of the upper grinding wheel and the lower grinding wheel move in opposite directions at different linear rates whereby the outer periphery of the lower grinding wheel moves faster than the outer periphery of the upper grinding wheel.

Figure 5:
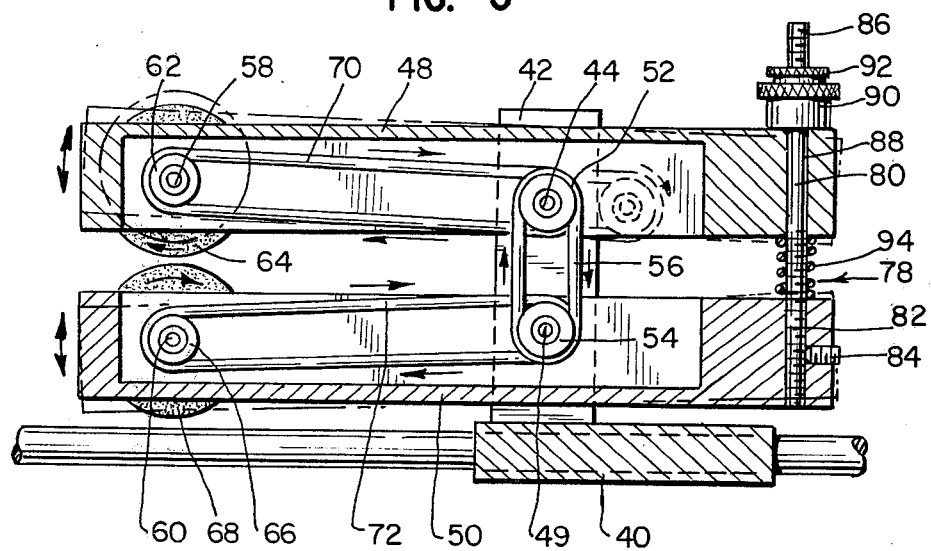
FIG. 5 is a cross-sectional view taken on line 5—5 of FIG. 3 showing the construction of the pivot arms with the drives for the grinding wheels added to show the interrelationship of the parts.
Figure 6:
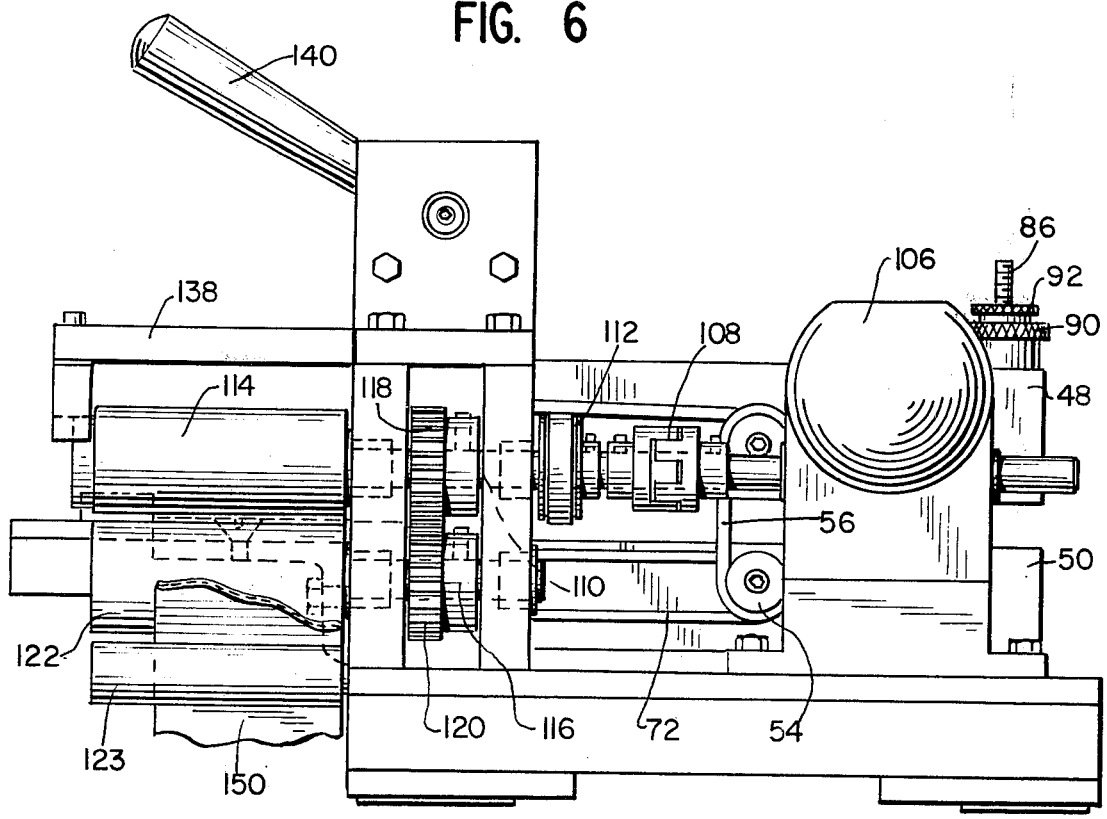
FIGS. 6 is an end view of the apparatus of FIG. 1 with a flat cable around one drive roller.
Figure 7:
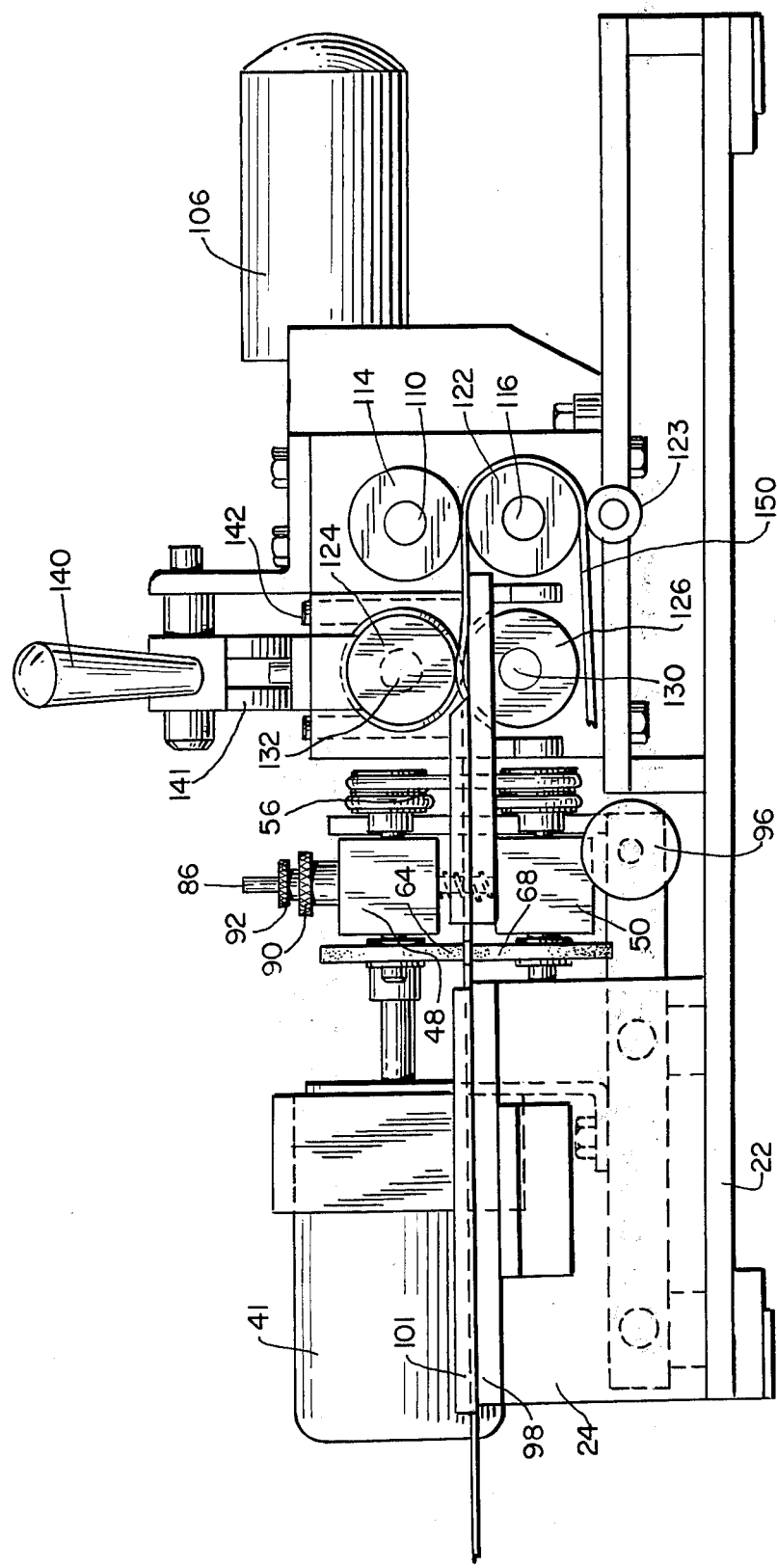
FIG. 7 is a front elevational view of the apparatus of FIG. 1.

The spacial relationship between the grinding wheels is determined by a pivot arm control 78 positioned on the end of the arms opposite to the ends having the grinding wheels mounted thereon. Pivot arm control 78 includes a control rod 80 having a mounting threaded portion 82 which is threadably mounted in arm 50 and secured into position by a set screw 84. The other end of the rod has an upper threaded portion 86. Arm 48 includes an enlarged elongated aperture 88 which freely receives the upper portion of the control rod. A nut 90 is threadably mounted on the upper threaded portion in engagement with the upper arm as may be best seen in FIG. 5. A locknut 92 is mounted on the threaded portion 86 and is engageable with the nut 90 to hold the nut in position. A compression spring 94 is mounted on the control rod. As shown in FIG. 5, spring 94 has one end in engagement with the lower side of arm 48 and with the upper side of arm 50 urging the adjacent ends of the arms apart from each other and thereby urging the grinding wheels towards each other. The rod 80 holds the grinding wheels in a selected spacial relationship as the arms pivot about shafts 44 and 49. A handle assembly 96 is connected to plate 40 to provide a convenient means for an operator to position grinding assembly 14 along rods 28 and 30 and thereby the grinding wheels relative to table 16.

Table 16 is mounted on frame 12 and is positioned above base 12. Table 16 includes a carrier plate 98 which has a slot 100 formed therein. The carrier plate is fixed to wall 24 and is substantially perpendicular thereto. The carrier plate has an adjustable side wall 101 mounted thereon to form a groove 102 between the adjustable side wall and wall 24, which groove is adapted for receiving flat cable to be ground by the grinding wheels. The carrier plate has a plurality of adjustment slots 103 formed therein for receiving fasteners 104 mounted in the adjustable side wall for securing the adjustable side wall relative to wall 24 to maintain groove 102 at a selected width. Groove 102 is adjusted to be the same width as the width of a flat cable to be ground so that there is no lateral movement of the cable.

Drive assembly 18 includes an electric cable drive motor 106 which is drivingly connected to a coupling 108. Coupling 108, in turn, is drivingly connected to shaft 110. A pulley 112 is drivingly mounted on shaft 110. A resilient surface drive roller 114 is mounted on shaft 110. A second shaft 116 is rotatably positioned below shaft 110. A pinion 118 is mounted on shaft 110 and meshes with a gear 120. Gear 120 is drivingly mounted on shaft 116. A second resiliant surface drive roller 122 is mounted on shaft 116 and engages roller 114 to grip a flat cable between the drive rollers. A take off roller 123 is positioned below roller 122 to guide flat cable after it has been pulled through the drive rollers.

A pair of slit rollers 124 and 126 is drivingly connected to drive motor 106. Each of the slit rollers is identical in construction to the other slit roller. Each slit roller includes a plurality of annular cutting edges 127 with grooves 128 between the cutting edges for receiving conductors while the cutting edges cut insulation between the conductors. Roller 126 is mounted on a shaft 130 and roller 124 is mounted on a shaft 132. The shafts 130 and 132 drivingly engage each other through a conventional gear and pinion arrangement (125). Shaft 132 has a drive sheave 134 fixed therein, which drive sheave is drivingly connected to pulley 112 by means of a belt 136, so that the slit rollers 124 and 126 rotate at the same speed as the drive rollers. Roller 124 is mounted in a movable block 138 which supports shaft 132. Block 138 with the shaft and roller may be depressed selectively by a pulling handle 140 downward to pivot a cam 141 against block 138 and thereby force the cutting edges of roller 124 against the cutting edges of roller 126 to slit insulation between the cutting edges. The movable supporting block or arm 138 supports the shaft 132 at one end via a downwardly extending bracket member 138', and at the other end by bearing blocks 139, 130'. The upper surfaces of the bearing blocks 139, 139' are fixedly joined to the underside of the movable block or arm 138, as clearly shown in FIG. 2. A plurality of guide pins 142 are provided, which are affixed to the frame 12 so that the bearing blocks 139 and 139' may slide therealong as the supporting block 138 is alternatively lowered or raised. When it is desired to slit the insulation, the handle 140 is pulled downwardly, forcing the upper slitter roller with its bearing blocks 139, 139' downwardly in order to bring the conventional gearing arrangement 125 into engagement, so that the lower slitter roller 126 is drivingly engaged to rotate and thus slit the insulation of the flat cable in conjunction with the upper slitter roller 124 driven by belt 136.

A typical flat conductor cable 150 includes a plurality of identical conductors 152 in one plane and those conductors are covered by insulation 154. The width of groove 102 in the table is adjusted for the width of the cable. The distance between the fiberglass grinding wheels is adjusted by adjusting nut 90 on rod 80 to pivot the arms about their respective shafts. It should be noted that irrespective of the amount of pivoting which occurs, the distance between each drive shaft 44 and 49 and its respective axle on each arm remains constant, so that the belt tension is not affected by the adjustment. The spacing between the grinding wheels is adjusted so that the spacing between the grinding wheels is equal to the diameter of the conductors 152 of the cable.

The flat cable is placed into groove 102. The cable is placed between the slit rollers and the drive rollers. The cable is positioned between drive roller 122 and roller 123 so that the cable comes back thereby allowing the apparatus to be loaded and unloaded from the same side. The drive rollers pull the cable along the table. When a sufficient length of cable has passed through and it is desired to remove the insulation at a given location, the drive rollers are stopped and the grinding wheels are energized. An operator grasps handle 96 and pulls the grinding assembly on rods 28 and 30 toward the table. The grinding wheels pass through slot 100 and engage the insulation on the cable. Since the grinding wheels are rotating in the same direction, the peripheries of the grinding wheels are moving in opposite directions so that the insulation on the bottom of the cable is being pushed in one direction, while the insulation on the top of the cable is pushed in the other direction. The grinding wheels are moved transversely across the length of the table to remove the insulation from a strip of cable as shown in FIG. 1. It is important to note that in view of the fact that the lower grinding wheel 68 has a larger diameter than the upper grinding wheel, the spacing between the wheels is not as critical as when the wheels have the same diameter.

Figure 2:
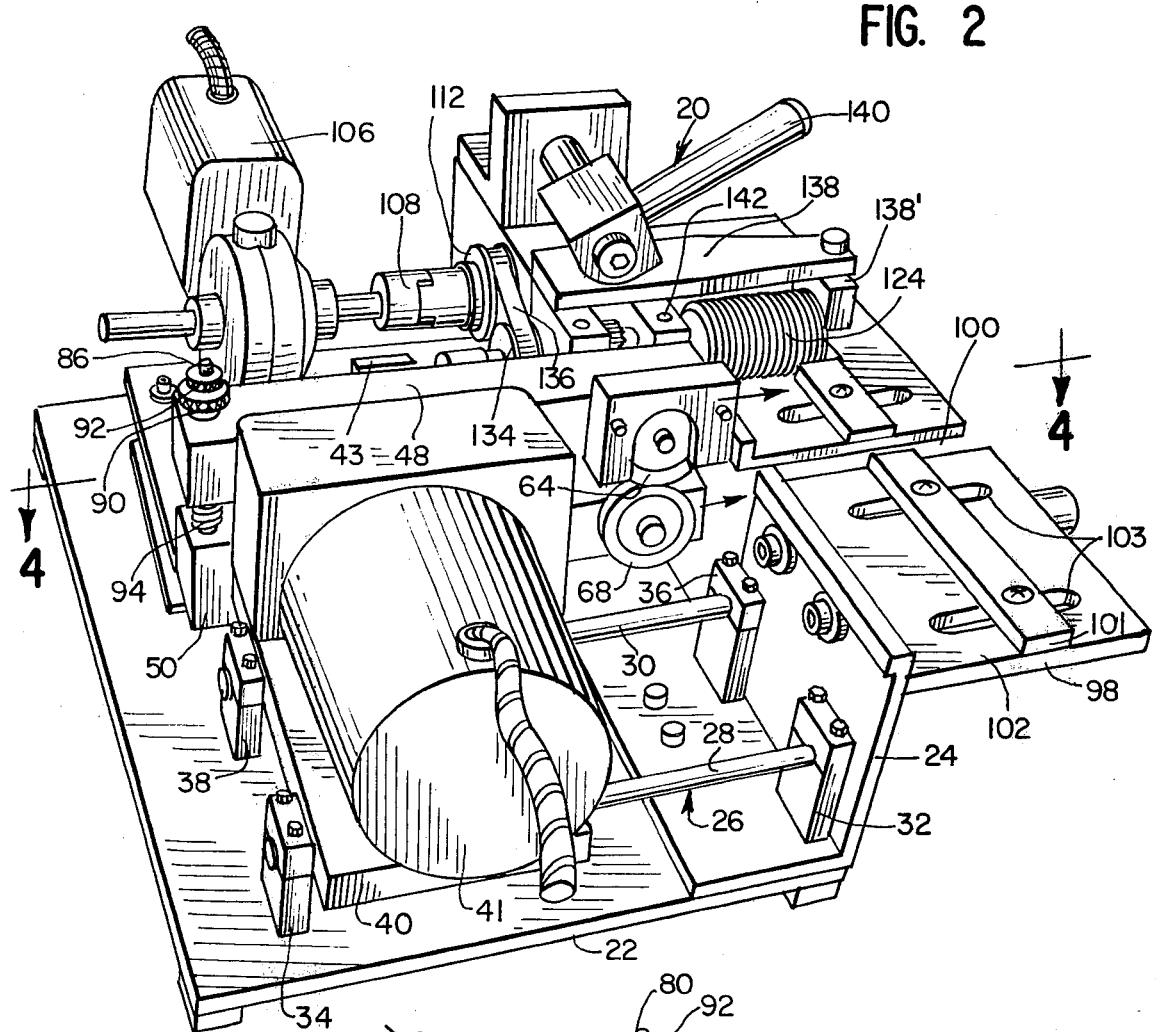
FIG. 2 is a perspective view of the apparatus shown in FIG. 1, but showing a pair of grinding wheels in a retracted attitude.
Figure 3:
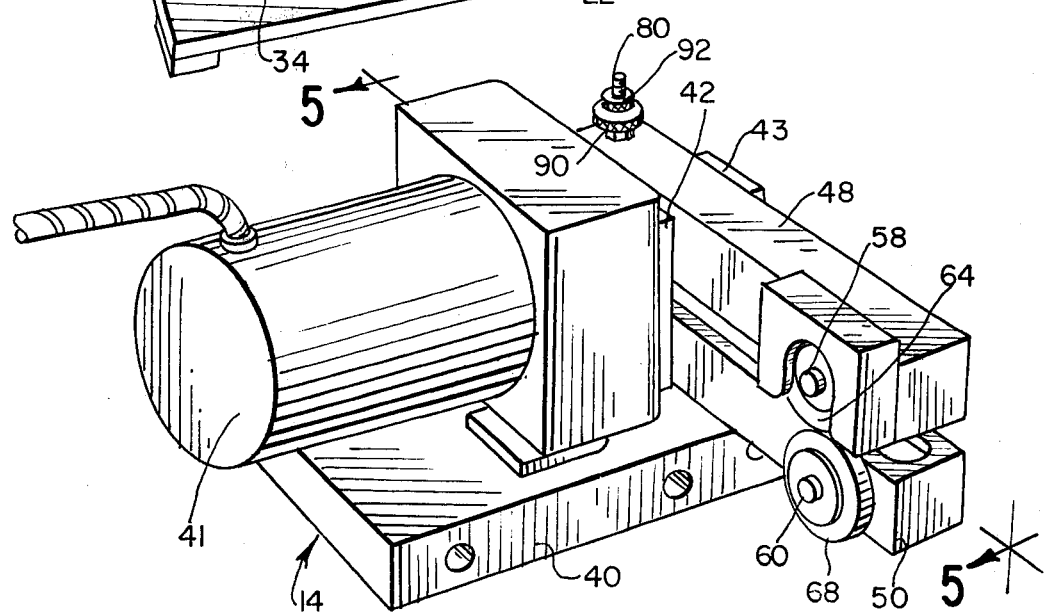
FIG. 3 is a perspective view of a grinding assembly of the apparatus shown in FIG. 1.
Figure 4:
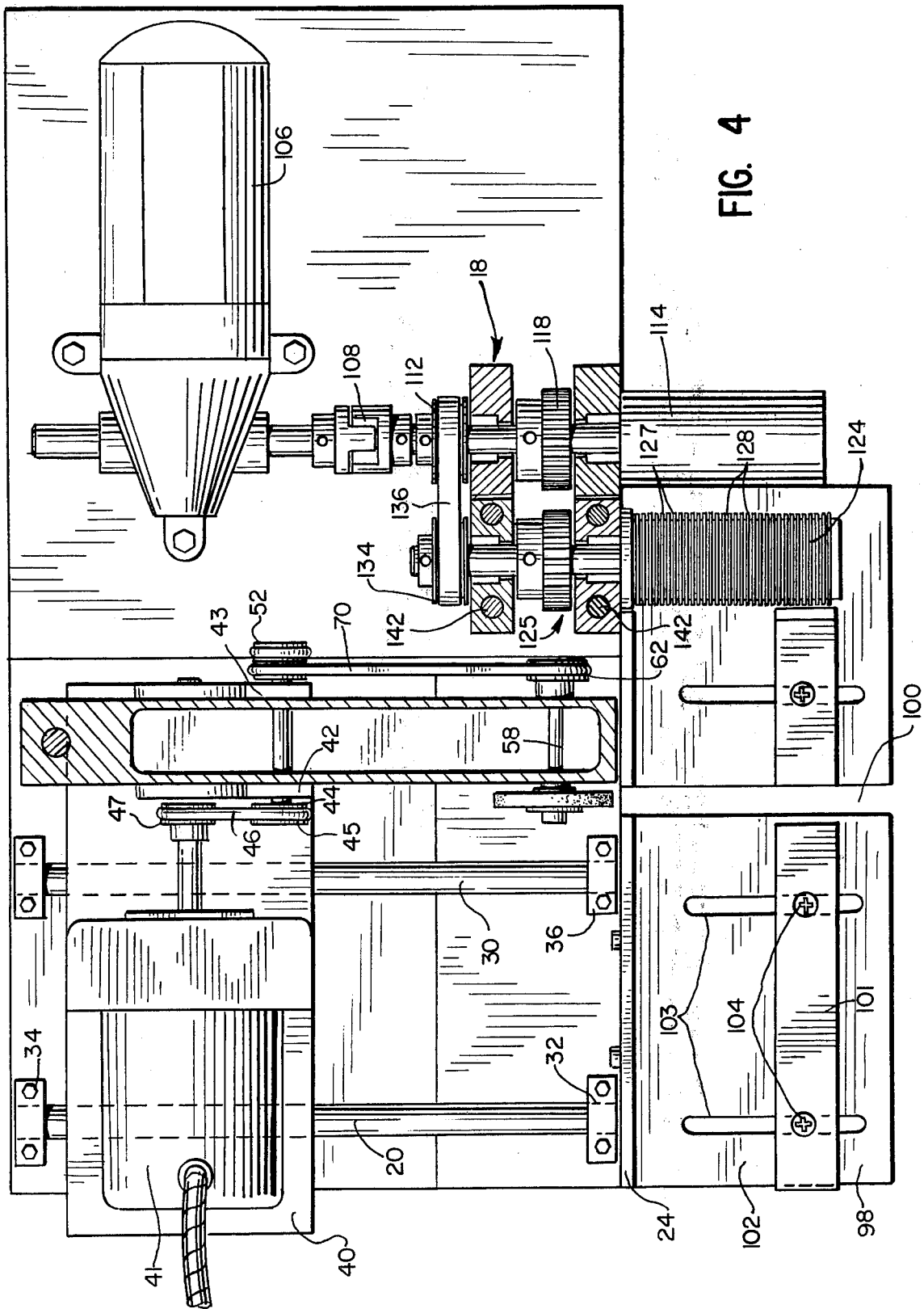
FIG. 4 is a plan view of the apparatus of FIG. 1, but showing the grinding assembly in a retracted attitude and with parts broken away in order to show better the construction thereof.

The grinding assembly is then moved back to its inactive position, or that shown in FIG. 2. The drive rollers are then activated to pull the cable longitudinally along the table. The slit rollers are brought down at the point whether desired to slit the insulation to spread the conductors. The operation is repeated for selected lengths of cable. The conductors are then cut so that opposite ends of lengths of cable have exposed conductors for attachment to terminals.

Although a specific embodiment of the herein disclosed invention has been described in detail, it is apparent that those skilled in the art may make various modifications and changes without departing from the spirit and scope of the present invention. It is to be expressly understood that the instant invention is limited only by the appended claims.

What is claimed is:

1. A stripping machine for removing insulation from flat cable having a plurality of conductors contained therein, wherein the conductors are in substantially the same plane, comprising:
   a frame;
   a pair of rotatable grinding wheels mounted to said frame and being engageable with opposite sides of the flat cable for grinding insulation from the cable above and below the conductors;
   means for rotatably mounting said pair of grinding wheels on said frame, said means for rotatably mounting comprising a motor means;
   a pair of rotatable slitting rollers for cutting portions of the insulation between conductors, one of said pair of slitting rollers being mounted oppositely to the other of said pair of slitting rollers to form a space therebetween through which the cable portion to be prepared is positioned;
   means for rotatably mounting said pair of slitting rollers to said frame; and
   means for moving one of said pair of slitting rollers/- toward and away from the other of said pair of rollers in a direction transverse to said direction parallel to the length of the cable,
   drive means for moving the cable along a direction parallel to the length of the cable, whereby the insulation of the cable is removed above, below, and on the sides of the conductors at a portion of the cable to prepare it for subsequent attachment to a connector.

2. A stripping machine for removing insulation from flat cable having a plurality of conductors contained therein, wherein the conductors are in substantially the same plane, comprising:
   a frame;
   a pair of rotatable grinding wheels mounted to said frame and being engageable with opposite sides of the flat cable for grinding insulation from the cable above and below the conductors;
   means for rotatably mounting said pair of grinding wheels on said frame, said means for rotatably mounting comprising a first motor means;
   at least one rotatable slitting roller for cutting portions of the insulation between conductors;
   means for rotatably mounting said at least one rotatable slitting roller to said frame; and
   drive means for moving the cable along a direction parallel to the length of the cable, said drive means comprising means for rotating said at least one rotatable slitting roller, a pair of oppositely disposed drive rollers defining therebetween a nip through which the cable passes and is advanced along said direction parallel to the length of the cable, and second motor means for rotating said pair of drive rollers; said means for rotating said at least one rotatable slitting roller connecting said second motor means to said at least one slitting roller, whereby the insulation of the cable is removed above, below, and on the sides of the conductors at a portion of the cable to prepare it for subsequent attachment to a connector.

3. A stripping machine for removing insulation from flat cable having a plurality of conductors contained therein, wherein the conductors are in substantially the same plane, comprising:
   a frame;
   a pair of rotatable grinding wheels mounted to said frame and being engageable with opposite sides of the flat cable for grinding insulation from the cable above and below the conductors;
   means for rotatably mounting said pair of grinding wheels on said frame, said means for rotatably mounting comprising motor means, at least one lever arm pivotally mounted relative to said frame for carrying thereon one of said pair of grinding wheels at one end of said at least one lever arm for movement toward and away from the other of said pair of grinding wheels, and adjusting means for varying the vertical distance between said pair of grinding wheels, said adjusting means being operatively connected to said at least one lever arm;
   at least one rotatable slitting roller for cutting portions of the insulation between conductors;
   means for rotatably mounting said at least one rotatable slitting roller to said frame; and
   drive means for moving the cable along a direction parallel to the length of the cable, whereby the insulation of the cable is removed above, below, and on the sides of the conductors at a portion of the cable to prepare it for subsequent attachment to a connector.

4. The stripping machine according to claim 3, comprising a pair of lever arms, one lever arm for each of said pair of grinding wheels, each of said pair of lever arms being pivotally mounted relative to said frame; said adjusting means being operatively connected to both of said pair of lever arms.

5. The stripping machine according to claim 4, wherein said adjusting means comprises a rod having a threaded portion thereof, each of said pair of lever arms having an opening formed through the other end thereof opposite the end which mounts a respective one of said pair of grinding wheels, said rod being received in each said opening; one said opening of one of said pair of lever arms being threaded for threadingly engaging with said threaded portion of said rod; and spring means telescopingly mounted about said rod between that portion of said rod extending between said lever arms so as to urge said other ends of said lever arms away from each other to thereby urge said grinding wheels toward each other; and means for pivotally mounting each of said lever arms, said means for pivotally mounting lying between said ends of each of said pair of lever arms.

6. A stripping machine for removing insulation from flat cable having a plurality of conductors contained therein, wherein the conductors are in substantially the same plane, comprising:

a frame;

a pair of rotatable grinding wheels mounted to said frame and being engageable with opposite sides of the flat cable for grinding insulation from the cable above and below the conductors;

means for rotatably mounting said pair of grinding wheels on said frame, said means for rotatably mounting comprising a motor means, a carriage means for moving said pair of grinding wheels in a direction transverse to the length of the cable and parallel to the width of the cable in order to alternatively advance and withdraw said pair of grinding wheels, so that the portion of the cable to be ground may first be ground and thereafter be advanced by withdrawing the grinding wheels therefrom;

at least one rotatable slitting roller for cutting portions of the insulation between conductors;

means for rotatably mounting said at least one rotatable slitting roller to said frame; and drive means for moving the cable along a direction parallel to the length of the cable, whereby the insulation of the cable is removed above, below, and on the sides of the conductors at a portion of the cable to prepare it for subsequent attachment to a connector.

7. The stripping machine according to claim 6, wherein said carriage means comprises a platform upon which is mounted said first motor means; and said means for rotatably mounting said pair of grinding wheels further comprises at least one rod, and means for mounting said rod to said frame; said platform having at least one passageway formed therethrough for receiving said at least one rod for sliding relationship therewith, said at least one rod being mounted to said frame in a direction transverse to the length of said cable so that said carriage means may be moved toward and away from the cable.

8. The stripping machine according to claim 7, wherein said means for rotatably mounting said pair of grinding wheels comprises at least one pivotal lever arm extending generally parallel with said at least one rod; said frame comprising a table portion upon which is supported a cable length, said table portion defining a first channel upon which the cable length advances; said table portion further including a slotted opening, said at least one lever arm being mounted in alignment with said slotted opening for movement of said pair of grinding wheels therethrough; said slotted opening spanning a portion of the cable to be prepared when said grinding wheels are grinding away the insulation of the cable portion.

9. The stripping machine according to claim 8, wherein said table portion further comprises a pair of spaced apart grooves, each of said pair of grooves extending in a direction transverse to the length of the cable, and further comprising cable width adjusting means movable and fixable along the lengths of said pair of grooves, said cable width adjusting means having one side edge surface for abutting against a side edge surface of the cable, so that the cable will be guided along said table portion, and so that cables of differing widths may be aligned on said table portion.

* * * * *